United States Patent Office.

NICHOLAS CLUTE, OF SCHENECTADY, NEW YORK.

Letters Patent No. 112,786, dated March 21, 1871.

IMPROVEMENT IN COATING GAS AND WATER-PIPES.

The Schedule referred to in these Letters Patent and making part of the same.

I, NICHOLAS CLUTE, of Schenectady, in the county of Schenectady, in the State of New York, have made certain Improvements in Coating Gas and Water-Pipes, of which the following is a specification.

Metallic pipes for conveying water or gas, in order to be kept from oxidizing, must be coated with some durable and not too expensive substance, such as will stand acids and the action of the water and gas.

My invention relates to the coating of metallic pipes by simple and cheap substances that will resist the action of air, gas, water, or acids.

And it consists in the application of a coating formed by the admixture of the hereinafter-named materials in the proportions to each other as follows:

Take of asphaltum one and a half pound; resin, one-half pound; beeswax, one-half pound; and paraffine wax, one-half pound. Melt and thoroughly incorporate them together when in a liquid state.

The metal pipe must be heated to about two hundred degrees of Fahrenheit, then be immersed in the liquid until every part is covered with such compound, when the pipe is carefully taken from the bath and placed upon end to drain and cool, and when cold the coating will be hard and the pipe ready for use.

Pipes thus treated will have a hard, smooth polish, particularly so after being cooled; and the pipes thus coated are passed through cold water, and will stand the exposure of the air, gas, water, and heat up to about three hundred degrees Fahrenheit, and resist successfully the action of sulphuric acid.

This coating can be applied to any metal pipe, or pipe made from wood or fibrous material, and add much to its durability, and can be applied to other things, and particularly to all vessels for holding liquids.

Pipes thus coated impart no taste to the water, and the water is as pure as if it had been taken from the fountain without contact with the coated pipe.

I am aware that some of the above-named substances have been used to coat metal pipes, and I lay no claim to the ingredients singly. I am also aware of the Patents No. 39,615, dated August 18, 1863; No. 38,022, dated March 31, 1863; and No. 96,936, dated November 16, 1869, and lay no claim to the compounds therein described and claimed; but, having fully described the invention,

What I claim, and desire to secure by Letters Patent, is—

The composition, for the purposes set forth, composed of the several ingredients in quantity and proportion of each as herein described.

NICHOLAS CLUTE.

Witnesses:
   EDM. F. BROWN,
   JOHN F. FENNELL